(12) United States Patent
Gardner

(10) Patent No.: US 8,622,669 B2
(45) Date of Patent: Jan. 7, 2014

(54) BROACHING TOOL

(76) Inventor: James Joseph Gardner, Lancaster, OH (US)

( * ) Notice: Subject to any disclaimer, the term of this patent is extended or adjusted under 35 U.S.C. 154(b) by 1154 days.

(21) Appl. No.: 12/476,219

(22) Filed: Jun. 1, 2009

(65) Prior Publication Data

US 2009/0297281 A1    Dec. 3, 2009

Related U.S. Application Data

(60) Provisional application No. 61/130,427, filed on May 30, 2008.

(51) Int. Cl.
*B23D 7/06* (2006.01)

(52) U.S. Cl.
USPC ............. 409/345; 409/297; 409/304; 407/15; 407/17; 407/113

(58) Field of Classification Search
USPC .......... 407/13, 15, 17, 66, 102, 113; 409/297, 409/298, 301, 302, 304, 345
IPC ................................ B23D 1/26,3/00, 3/02, 7/06
See application file for complete search history.

(56) References Cited

U.S. PATENT DOCUMENTS

| | | | | | |
|---|---|---|---|---|---|
| 373,680 | A | * | 11/1887 | Morton | 409/304 |
| 421,345 | A | * | 2/1890 | Benson | 407/9 |
| 940,938 | A | * | 11/1909 | Morton | 409/345 |
| 1,514,842 | A | * | 11/1924 | Evans | 407/113 |
| 2,263,870 | A | * | 11/1941 | Currie | 409/296 |
| 2,455,973 | A | * | 12/1948 | Boyd, Jr. | 407/102 |
| 2,868,090 | A | * | 1/1959 | McCullough | 409/330 |
| 3,722,362 | A | * | 3/1973 | Pitts et al. | 409/299 |
| 5,305,506 | A | * | 4/1994 | Forman | 29/10 |
| 6,942,438 | B1 | * | 9/2005 | Deguise | 409/293 |
| 7,988,029 | B2 | * | 8/2011 | Gleason | 228/13 |
| 2010/0104390 | A1 | * | 4/2010 | Schaefer | 409/287 |

FOREIGN PATENT DOCUMENTS

| | | | | |
|---|---|---|---|---|
| DE | 3333117 A1 | * | 3/1985 | B23D 13/00 |
| DE | 3934703 A1 | * | 4/1991 | B23D 13/00 |

* cited by examiner

*Primary Examiner* — Daniel Howell
*Assistant Examiner* — Nicole N Ramos
(74) *Attorney, Agent, or Firm* — Donn K. Harms

(57) ABSTRACT

A broaching tool for machining a workpiece formed of a parallelogram shaped insert which fits within a slot formed in a body member. The insert has two juxtaposed corners either of which may be oriented at the distal end of the body member to function as a cutting edge. Repositioning of the insert to place either cutting edge in place is provided by flipping it over in its engagement within the slot. The inserts may be provided in a kit of differently configured inserts to yield different cutting widths.

19 Claims, 2 Drawing Sheets

BROACHING TOOL

This application claims priority to U.S. Provisional Patent Application No. 61/130,427 filed on May 30, 2008 incorporated herein in it's entirety by reference.

FIELD OF THE INVENTION

The disclosed invention relates to machine tooling. More particularly it relates to a broaching tool having a reversible indexable cutting insert which is configured to maintain a registration with the engaged tool body when the insert is reversed to expose a new cutting edge of the insert.

BACKGROUND OF THE INVENTION

In the metalworking industry of machine shops, a cutting tool is any tool that is employed to remove metal from the workpiece being machined. This removal is accomplished generally by means of a shear deformation. Essentially, with the workpiece or the tool in motion, the tool is placed in controlled contact with the workpiece to thereby remove material such as metal strategically, to thereby form the desired shape to the workpiece.

Tools generally employ a bit or insert, which is engaged to a holder. The bit or insert is formed of material sufficiently hard to cut the workpiece in the manner intended. Over time, the cutting formed by the bit or insert tends to dull from repeated contact with the workpiece to remove material. The insert must therefore be replaced to maintain the quality of the workpiece produced and the speed of the operation producing the parts formed by the fully machined workpiece. A dull tool insert will not only slow the process, it can easily yield inferior parts from chatter and other problems inherent to contact of a dull insert with the workpiece being machined.

Additionally, the cutting tool insert must employ a specific geometry so as to place the cutting edge of the tool insert in proper contact with the workpiece. Concurrently, the rest of the tool insert must be spaced from the workpiece to prevent dragging of non cutting surfaces upon workpiece. Other elements of tool insert geometry such as the angle of the cutting edge, the flute width, the tool margin and hardness of the cutting edge also must be maintained during use of the tool insert to work upon the workpiece.

Frequently employed in modern machining is the lathe, particularly a Computer Controlled (CNC) lathe. Such devices generally spin the workpiece against a plurality of sequentially positioned tool inserts to thereby yield a final component. One operation which can be employed with the lathe is the art of broaching. In broaching, instead of spinning the workpiece, the lathe's spindle is locked in place to hold the workpiece engaged in a fixed position. Thereafter a broaching tool insert is driven into and out of the workpiece being held by the spindle to thereby create keyways and slots within the workpiece.

This mode of operation of the lathe increases the number of operations which can be performed in a single chuck on a single lathe. Also, because the same machine is employed for two operations for a fixed in position workpiece, the accuracy of the dimensions of the final part formed by the fully machined workpiece is increased. This is because the workpiece need not be removed and remounted from machine to machine, which causes errors in the accuracy of sequential cuts to the workpiece. Shop labor time is also reduced since the workpiece need not be continually dismounted and remounted. Further, the need for specialized broaching machinery is reduced since the workpiece is held by the lathe for a plurality of cuts to the workpiece.

In the broaching operation, cutting tools are employed in a number of configurations. In one conventional configuration, carbide or similar tool inserts, have a cutting edge formed thereon which is a separate part that is brazed to a tool body portion. This creates a sturdy, yet permanently engaged cutting insert from the two individual parts. However, with only one cutting edge formed of two components, during each replacement of a dull tool insert, the set up must be re-registered to position the cutting edge of the tool insert to properly machine the workpiece.

A second configuration employs a tool insert which is replaceable and held in removable engagement with a tool body. This allows for replacement of the tool insert, when dull, by dismounting it from its holder, and engaging a new tool insert. However, the temporary engagement with the holder using screws or other means of engagement suffers from chatter during machining of the workpiece due to the minimal contact of set screws and the like with the tool insert to engage it to the holder. Additionally, such tool inserts generally require a new setup of the tool insert geometry each time the cutting tool insert is replaced.

Both conventional types of broaching tool configurations suffer from dulling of the single cutting edge of the cutting tool insert. Since they thus require frequent replacements machining time is significantly increased by the need to re-register the geometry of the cutting tool insert with the workpiece after each replacement. Accuracy of the parts formed by the machined workpiece suffers due to the numerous reconfigurations of the tool insert each time the single cutting edge wears past desired specifications.

During replacement of brazed cutting tool inserts the dismounting of the cutting tool insert and subsequent brazing of a new cutting edge portion to the body, is tedious at best. The process then requires the entire cutting tool insert to be registered in engagement relative to the machine and the workpiece position to yield the desired material cuts to the workpiece.

Replacement of an insertable and screw-held cutting tool inserts, while somewhat easier, still suffer from chatter and other problems due to the nature of the engagement of the cutting tool insert to the body of the tool holding it. Further, due to the variance in dimensions of each different cutting tool insert, re-registration of the geometry of the insert to the workpiece is virtually assured.

Accordingly, there exists an unmet need for a method for a broaching cutting tool device which provides the convenience of a replaceable cutting tool insert with a tool body. Such a device should however be free of the problems inherent with conventional tool inserts of chatter due to poor engagement with the holder, and the need to re-setup the tool geometry each time, due to varying engagement with the body holding it.

With respect to the above, before explaining at least one preferred embodiment of the invention in detail, it is to be understood that the invention is not limited in its application to the details of construction and to the arrangement of the components or steps set forth in the following description or illustrated in the drawings. The various apparatus and methods of the invention are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based, wherein a cutting tool insert is shaped to engage with the cutting tool body holding it, in a manner to yield a stronger and more accurate mount, may readily be utilized as a basis for designing of other devices, and methods and systems for carrying out the several purposes of the present disclosed device and method. It is important, therefore, that the objects and claims be regarded as including such equivalent construction and methodology, insofar as they do not depart from the spirit and scope of the present cutting tool invention.

SUMMARY OF THE INVENTION

The device and method herein described and disclosed is a cutting tool employed for broaching. The device is formed of a body portion and a removable cutting insert which has a plurality of cutting edges adapted for cutting a workpiece.

The body portion is adapted at a first end, for engagement to a machine tool mount which is well known to those skilled in the art such as those employed on a lathe or CNC machine. Also, at the first end of this body portion is a means for communication of a stream of cooling fluid to the distal end of the body portion, which may be employed for lubricating and cooling the workpiece and cutting insert during use.

On the distal end of the device, a slot provides means for registered engagement of a cutting tool insert therein. The shape of the insert and the shape of the slot, provide for exceptional repeatable accuracy in the positioning of the cutting edge of any such tool insert, relative to the workpiece. Thus registration of the cutting tool geometry to the workpiece is substantially eliminated or minimized.

The current preferred shape of the tool insert is a parallelogram. The tool insert has an as-used position mounted within the slot formed within the tool body which is configured similarly in shape. In the as-used position, a leading corner of the insert is formed at the intersection of a first endwall and the first side edge of the insert, which when mounted, is positioned just above the distal end of the tool. From a center section of the first side surface, the first side surface of the tool insert is formed at a declining angle relative to a declining angle of the second side surface of the insert from the center section of the second side surface. This declining or narrowing angle is toward the top side of the tool body in which the slot is formed.

A second corner of the insert, at the intersection of the second side edge and the second endwall of the insert, is positioned within and in contact with, the slot of the tool body. The second side edge is of a length to extend past the center axis of the elongated body portion of the tool when in the as-used position.

The cutting insert is dimensioned in the preferred mode, as a parallelogram with both the top or first side edge surface and the second side edge surface parallel to each other as are the first endwall and second endwall. This shape has been found to be especially preferred in that it places the first corner of the tool insert, used for cutting the workpiece, above the tool body. More importantly, this configuration concurrently engages the entire second sidewall of the tool insert in contact with a rear wall of the slot formed in the tool body. This engagement directs the force caused by the first corner engaging the workpiece in a translation of the tool in a jig, directly to the tool body along its strongest point at the central axis of the body.

The shape of the insert places the entire surface of the trailing or second endwall in contact with a parallel surface of the slot in the body and thereby allows for maximum transmission of force from cutting the workpiece, directly to the body to relieve chatter of the insert. Further, both the first and second endwalls of the insert are angled such that in the as-used position, they are substantially perpendicular to the center axis of the tool body. This positioning of the endwalls substantially normal to the body axis provides additional means to transmit a maximum amount of force exerted on the insert during cutting to the tool body. Consequently, it is preferred that the angles of the endwalls and opposing side edge surfaces of the insert are dimensioned to yield this engagement with the body when in the as-used position.

In addition to the maximum transfer of force from the insert to the body for a more stable cutting edge, the dimensioning of the insert as a parallelogram yields an additional benefit to the device. The insert may be formed with cutting edges on two opposing corners which allows for the insert to be flipped in its engagement in the slot of the body to thereby expose a fresh cutting edge during use if replacement is needed. Because of the dimensional characteristics of the insert noted above, when flipped to position the opposite corner in the cutting position in the body, the newly positioned corner is placed perfectly in position to cut the workpiece. This eliminates the need to re-setup the tool as is required with conventional broach cutting tools.

Secure mounting of the cutting insert in the slot of the body is provided by a plurality of allen or other bolts threadably engaged to the body to communicate with one side wall surface of the insert. Both sidewall surfaces have a central portion which is substantially planar and extends parallel to the center axis of the body of the tool when the insert is in the as-used position. Consequently, when the insert is mounted or flipped and remounted, the two planar surfaces provide an excellent mount of the insert with the sidewalls of the slot. A tightening of the set screws hold the insert in the slot in the as-used position.

From the planar center section of both sidewalls, a relief is formed in the sidewall surface, to angle it toward the first and second side surfaces. This relief is substantially triangular in shape to thereby keep the planar center sections of both sidewalls running parallel to the center axis of the body when in the as-used position.

It is thus an object of the invention to provide a machine tool for broaching which provides a cutting insert engaged to a body portion which may be flipped to yield a new cutting edge without the need to re-setup the geometry of the tooling.

It is a further object to provide a device wherein a new insert may be engaged to the body of the tool without the need to re-setup the tooling.

It is yet an additional object of this invention, to provide such an insert that is dimensioned to minimize chatter by transmitting a maximum amount of force to the body holding the insert while cutting.

These together with other objects and advantages which will become subsequently apparent, reside in the details of the method and device for proximate communication between authorizing users as more fully hereinafter described and claimed, reference being had to the accompanying drawings forming a part thereof, wherein like numerals refer to like parts throughout

DETAILED DESCRIPTION OF THE INVENTION

Figure 1:
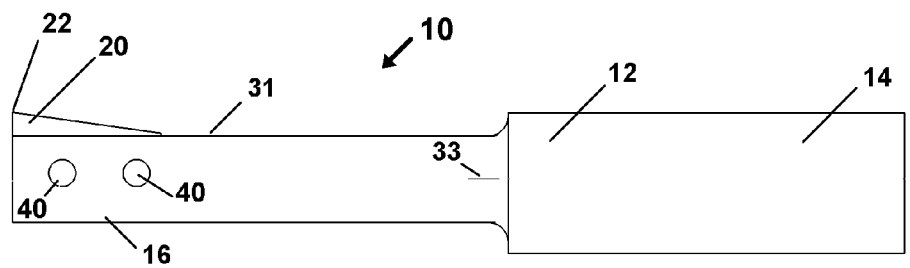
FIG. 1 depicts the device showing the cutting insert held by set screws in the as-used position in the body portion.
Figure 2:
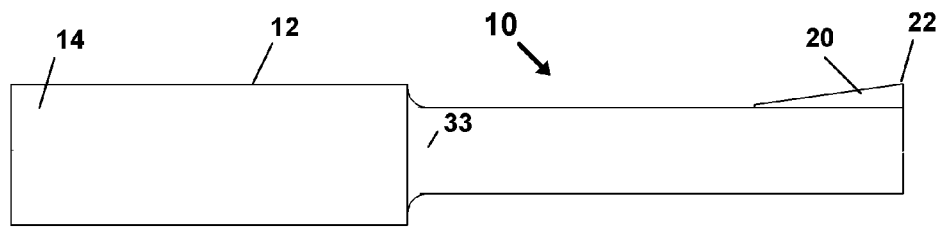
FIG. 2 depicts the opposite side from FIG. 1.

Referring now to the drawings in FIGS. 1-8 individually or as a group, wherein similar parts are identified by like reference numerals, the device 10 is depicted in figures as a broaching tool for cutting a workpiece.

Figure 3:
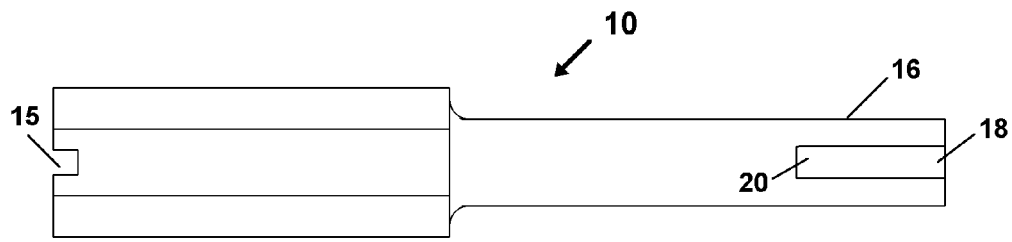
FIG. 3 depicts a top plan view of the device of FIG. 1.
Figure 4:
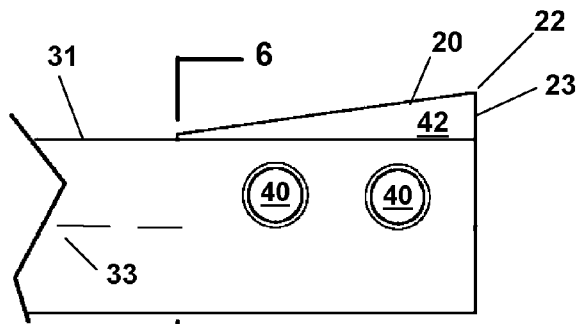
FIG. 4 shows the parallelogram-shaped insert inside a similarly dimensioned slot in the as-used position.

A body 12 portion is adapted at a first end 14, for engagement to a machine tool mount on a lathe which would hold the workpiece. Also shown at the first end, 14 in FIG. 3 is a relief 15 which provides means for engagement of a cooling fluid for lubricating and cooling the workpiece and the insert 20 engaged in the slot 18 at the distal end 16 of the body 12.

At the distal end 16 opposite the first end 14, the slot 18 is formed to provide means for registered engagement of a cutting insert 20 therein and contacting surfaces of the slot 18. The current preferred shape of the insert 20 is that of a parallelogram and the shape of the slot 18 is a conforming parallelogram.

The insert 20 has an as-used position shown in FIGS. 1, and 4-6 which depict it removably engaged within the slot 18 on the tool body 12 with a leading corner or leading cutting edge, shown as the first corner 22, providing a leading cutting edge positioned at the intersection of a first endwall 23 and a top or first side surface 24 of the insert 20. The first side surface 24 of the insert 20 declines at an angle toward the central portion 41 and the second endwall 28 of the insert 20. When in the as used position, the angle declines toward the center axis 33 or top side 31 of the tool body 12.

At the intersection of the second side surface 30 and the second endwall 28 of the insert 20, a second cutting edge 43 is provided at the trailing corner 22 or second corner 32 positioned opposite to the first corner 22. When flipped, the insert 20 positions the second corner 32 as the leading corner or cutting edge, and the first corner 22 in a trailing corner 25 position.

The positioning of the second endwall 28, or the first endwall 23 when the insert 20 is flipped, against a rear wall 36 of the slot 18. This positioning directs the force caused by the first corner 22 or second corner 32 depending on which way the insert 20 is engaged in the slot 18, in a cutting of the workpiece, along the center axis 33 of the tool body 12 where it is strongest. The parallelogram shape maximizes the area of contact area of the rear wall 36 of the slot 18, and the first or second endwall 23 or 28. This contact area is substantially perpendicular to the center axis 33 of the body 12 to maximize transmission of force from the insert 20 to the body.

The insert 20 is dimensioned for engagement into the slot 18 such that it may be secured by set screws 40 against the thicker central portion 41 which is substantially the same in width as the short side width or rear wall 36 width of the slot 18. The parallelogram shape of the insert 20, the substantially equal width of the central portion 31 to the width 36 allow the insert 20 to be flipped in its engagement in the slot 18, without the need to re-setup the insert 20 and body 12, relative to the workpiece. Both sidewall surfaces of the insert 20 have a central portion 41 which is substantially planar on both sides and extends parallel to the center axis 33 of the body 12 of the tool when the insert 20 is in the as-used position.

Thus, the shape of the insert 20 and contact of the trailing corner 22 or 32, with the rear wall 36, and a contact of the central portion 31, with the sides of the slot 18, provide means to maintain the relative geometry of the insert 20 with the workpiece when the insert 20 and flipped in its engagement to the body 12 and to eliminate the need to readjust the insert 20 to the workpiece upon such a change in position. This secure mount configuration also reduced chatter from which conventional tools suffer.

Figure 5:
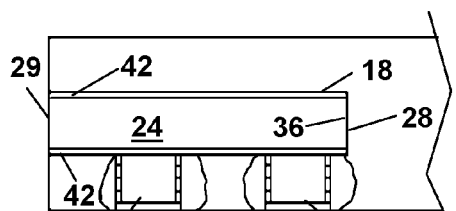
FIG. 5 depicts the slot in the distal end of the body running along the center axis of the elongated body and the angled sides of the tool insert.
Figure 6:
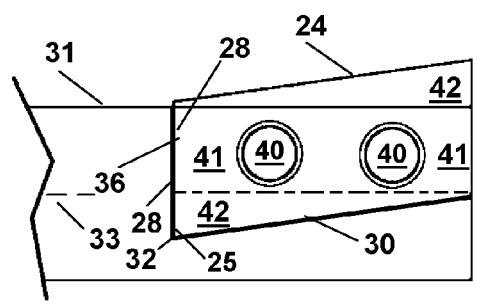
FIG. 6 depicts a slice through FIG. 4 along lines 6-6 showing the slot in contact with the endwall and side edge of the insert.
Figure 7:
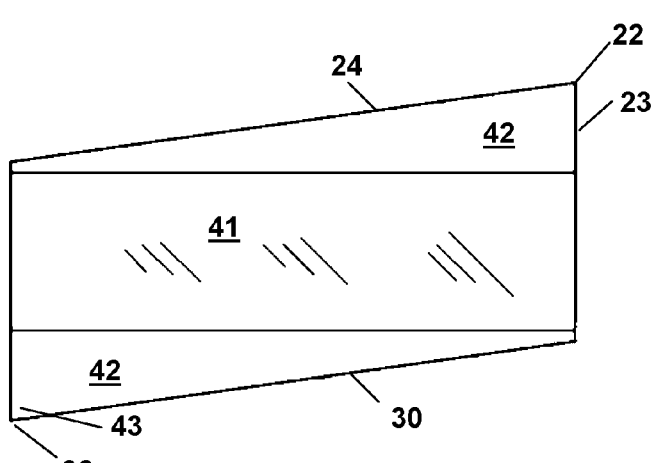
FIG. 7 is an enlarged view of a side surface of the tool insert showing the triangular relief sections extending toward the first and second side edges, from the planar center section.
Figure 8:
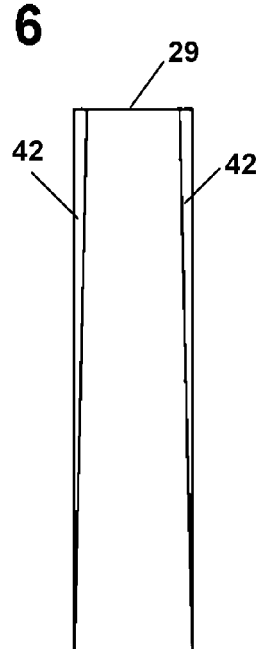
FIG. 8 is an end view of the insert of FIG. 7 showing the angled portions of the sidewalls extending from the planar center section.

From the planar center section 41, a pair of triangular reliefs 42 is formed in the sidewall surfaces on both sides of the insert 20. The triangular reliefs 42, provides clearance on both sides of the insert 20 in the as used position and from the top surface 31 of the body 12. The depth of the triangular reliefs 32 determine a width 29 of the leading cutting edge as shown in FIG. 5. This can vary depending on the depth of the reliefs 42 in their angle from the central section 41 to the first or second side surfaces 24 and 30. When engaged in either orientation, the triangular reliefs 42 positions the hypotenuse of that triangular shape, which depending insert 20 orientation is the first side surface 24 or second side surface 30, at a declining angle toward the top surface 31 of the body 12. The shortest side of the triangular shaped reliefs 42 will always lead with the leading cutting edge of the insert 20 when in the as used condition.

In broaching, contact of the leading edge of the insert 20, with the workpiece, will generally impart a downward and rearward force on the insert 20. The large area of contact of the trailing surfaces of the insert 20, with the slot 18 eliminates chatter and positioning of the trailing corner position 25 below the center axis 33 of the body 12, has been found to resist the rotational force on the insert by the contact of the leading edge with the workpiece, further reducing chatter. Therefor it is important to configure the slot 18 to mirror the shape of the insert 20, with a width substantially equal to or slightly larger than the width across the central section 41, and to position the trailing corner position 25 below the center axis 33 of the body 12 to be engaged therewith.

The device 10 may be provided as a kit form where a body 12 has a slot 18 configured for multiple inserts 20 all of which would seat into the slot 18, and be replaceable with other inserts 20 from the kit, without having to reorient the geometry of the insert 20 and body 12 to the workpiece. Further, all of the inserts 20 could be flipped in the slot 18 to provide a new and sharp cutting edge without the need for a new insert 20. Finally, the triangular reliefs 42 can be provided at varying angles toward each other, and thus reliefs toward each other, to form the first and second side surfaces 24 and 30 in a manner yielding a leading cutting edge width 29 that can be wider or narrower depending on the width of the broach intended. In a kit form, a plurality of different inserts 20 may therefor be provided, all with different cutting edge widths 29, all of which will securely mount in the body 12. All such inserts 20 would also be capable of changing orientation by flipping to reveal a second cutting edge in the correct position to function as the leading cutting edge without the need to reposition the insert 20 or body 12 to continue broaching workpieces.

While all of the fundamental characteristics and features of the improved disclosed and described broaching tool have been described, a latitude of modification, various changes and substitutions are intended in the foregoing disclosure and it will be apparent that in some instances, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. A broaching tool apparatus for machining a workpiece, comprising:
   an insert, said insert adapted to engage within a slot formed upon a distal end of a body member, said body member having an opposite end adapted to engage a mount, said body member having a longitudinal axis along a length of said body member;
   said slot including a sloped bottom and a rear wall extending substantially perpendicular said longitudinal axis of said body member, an intersection of said sloped bottom and said rear wall of said slot forming an acute angle;
   said insert having a shape, said shape being a parallelogram shape defined by two parallel side edges of substantially equal length, a first end communicating between said side edges, and a second end opposite and substantially parallel to said first end, said second end communicating between said side edges;
   said insert having an as-used position in said slot in a first orientation or a second orientation;
   said first orientation positioning a first corner of said insert in a cutting position above a top edge of said distal end of said body member;
   said second orientation positioning a second corner, juxtaposed to said first corner, in said cutting position;
   at least one fastener to maintain said insert in said slot in either of said first orientation or said second orientation, whereby said insert may be engaged in said as-used position and changed between said first orientation or second orientation, to thereby place either of said first corner or said second corner in said cutting position interchangeably, without an adjustment of the geometry of said insert or said body member relative to said workpiece;
   wherein said first corner and said second corner each form an acute angle in said parallelogram shape of said insert; and
   wherein said acute angle formed by said first corner and said second corner in said parallelogram of said insert is substantially the same as the acute angle formed by said intersection of said sloped bottom and said rear wall of said slot.

2. The broaching tool of claim 1, additionally comprising:
   said insert having two sidewalls extending in-between said two parallel side edges and said first and second ends;
   a central portion of said insert extending along said two sidewalls in-between said first end and said second end, said central portion having a separation distance defined by a distance between said two sidewalls;
   a first pair of triangular reliefs formed between said a first of said parallel side edges and said central portion;
   a second pair of triangular reliefs formed between said a second of said parallel side edges and said central portion;
   wherein said first and second pair of said triangular reliefs of the insert form a substantially right triangle, wherein a longer leg of said substantially right triangle of said first and second pair of said triangular reliefs is substantially parallel said longitudinal axis of said body member;
   said first pair of reliefs and said second pair of reliefs determining a width of said first corner and said second corner, said width being less than said separation distance.

3. The broaching tool of claim 2, additionally comprising:
   said slot having parallel side surfaces, said side surfaces spaced a distance apart slightly larger than said separation distance, whereby said central portion of said insert is in frictional engagement with both of said side surfaces.

4. The broaching tool of claim 3, additionally comprising:
   said at least one fastener to maintain said insert in said slot is at least one set screw communicating through said body member into said slot in a position to engage upon said central portion of said insert in said as-used position.

5. The broaching tool of claim 3, additionally comprising:
   said insert being a member of a kit of a plurality of said inserts; and
   each said member of said plurality having a different said width of said first corner and said second corner defined by said first and second pair of triangular reliefs.

6. The broaching tool of claim 4, additionally comprising:
   said insert being a member of a kit of a plurality of said inserts; and
   each said member of said plurality having a different said width of said first corner and said second corner defined by said first and second pair of triangular reliefs.

7. A broaching tool apparatus for machining a workpiece, comprising:
   a body member having a first end and having a distal end;
   said body member having a longitudinal axis along a length of said body member;
   a slot formed upon said distal end of a body member;
   said slot including a sloped bottom and a rear wall extending substantially perpendicular said longitudinal axis of said body member, an intersection of said sloped bottom and said rear wall of said slot forming an acute angle;
   an insert, said insert configured to engage within said slot;
   said insert having a shape, said shape being a parallelogram; defined by two parallel side edges of substantially equal length, a first end communicating between said side edges, and a second end opposite and substantially parallel to said first end, said second end communicating between said side edges;
   said insert having an as-used position in said slot in a first orientation or a second orientation;
   said first orientation positioning a first corner of said insert in a cutting position above a top edge of said distal end of said body member;
   said second orientation positioning a second corner, juxtaposed to said first corner, in said cutting position; and
   at least one fastener to maintain said insert in said slot in either of said first orientation or said second orientation, whereby said insert may be engaged in said as-used position and changed between said first orientation or second orientation, to thereby place either of said first corner or said second corner in said cutting position interchangeably, without an adjustment of the geometry of said insert or said body member relative to said workpiece;
   wherein said first corner and said second corner each form an acute angle in said parallelogram shape of said insert; and wherein said acute angle formed by said first corner and said second corner in said parallelogram of said insert is substantially the same as the acute angle formed by said intersection of said sloped bottom and said rear wall of said slot.

8. The broaching tool of claim 7, additionally comprising:
said insert having two sidewalls extending in-between said two parallel side edges and said first and second ends;
a central portion of said insert extending along said two sidewalls in-between said first end and said second end said, said central portion having a separation distance defined by a distance between said two sidewalls;
a first pair of triangular reliefs formed between said a first of said parallel side edges and said central portion;
a second pair of triangular reliefs formed between said a second of said parallel side edges and said central portion;
wherein said first and second pair of said triangular reliefs of the insert form a substantially right triangle, wherein a longer leg of said substantially right triangle of said first and second pair of said triangular reliefs is substantially parallel said longitudinal axis of said body member;
said first pair of reliefs and said second pair of reliefs determining a width of said first corner and said second corner, said width being less than said separation distance.

9. The broaching tool of claim 8, additionally comprising:
said slot having parallel side surfaces, said side surfaces spaced a distance apart slightly larger than said separation distance, whereby said central portion of said insert is in frictional engagement with both of said side surfaces.

10. The broaching tool of claim 9, additionally comprising:
said at least one fastener to maintain said insert in said slot is at least one set screw communicating through said body member into said slot in a position to engage upon said central portion of said insert in said as-used position.

11. The broaching tool of claim 8, additionally comprising:
said insert being a member of a kit of a plurality of said inserts; and
each said member of said plurality having a different said width of said first corner and said second corner defined by said first and second pair of triangular reliefs.

12. The broaching tool of claim 9, additionally comprising:
said insert being a member of a kit of a plurality of said inserts; and
each said member of said plurality having a different said width of said first corner and said second corner defined by said first and second pair of triangular reliefs.

13. The broaching tool of claim 10, additionally comprising:
said insert being a member of a kit of a plurality of said inserts; and
each said member of said plurality having a different said width of said first corner and said second corner defined by said first and second pair of triangular reliefs.

14. The broaching tool of claim 1 wherein said first end and said second end of said parallelogram shape of said insert are substantially parallel to said rear wall of said slot and said two parallel side edges of said parallelogram shape of said insert are substantially parallel said sloped bottom of said slot.

15. The broaching tool apparatus of claim 7 wherein said first end and said second end of said parallelogram shape of said insert are substantially parallel to said rear wall of said slot and said two parallel side edges of said parallelogram shape of said insert are substantially parallel said sloped bottom of said slot.

16. The broaching tool of claim 1 wherein said rear wall of said slot contacts one of said first end and said second end of said insert with said insert located in said as-used position and wherein said sloped bottom of said slot contacts one of said two parallel side edges of said insert with said insert located in said as-used position.

17. The broaching tool apparatus of claim 7 wherein said rear wall of said slot contacts one of said first end and said second end of said insert with said insert located in said as-used position and wherein said sloped bottom of said slot contacts one of said two parallel side edges of said insert with said insert located in said as-used position.

18. The broaching tool of claim 1 wherein said opposite end of said body member includes a relief passage for allowing cooling and lubricating fluid to flow to cool and lubricate the insert.

19. The broaching tool apparatus of claim 7 wherein said first end of said body member includes a relief passage for allowing cooling and lubricating fluid to flow to cool and lubricate the insert.

\* \* \* \* \*